June 10, 1930.   P. MUELLER   1,762,305
SERVICE CLAMP
Filed Nov. 20, 1926
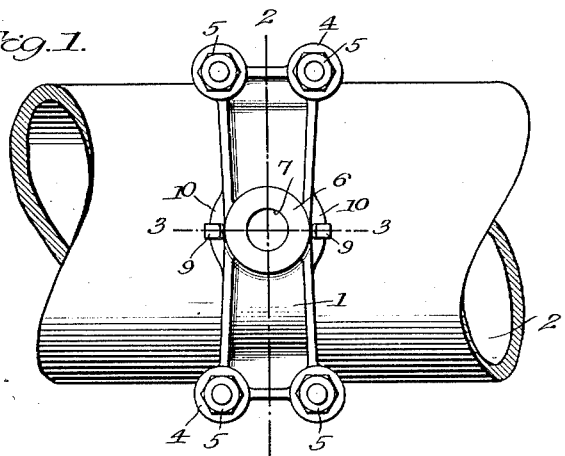
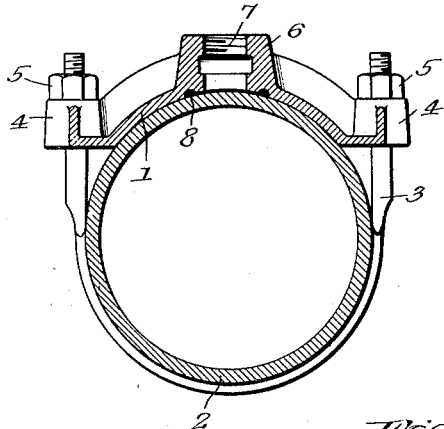
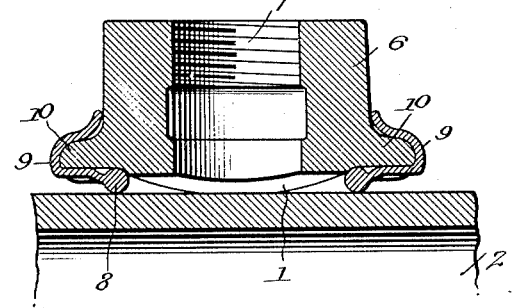
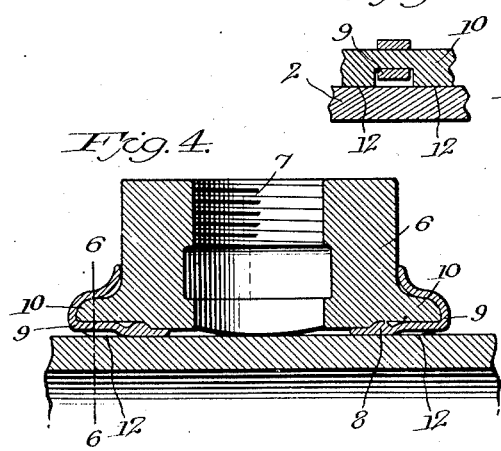
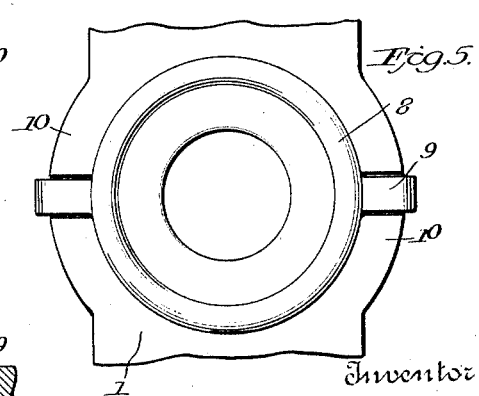
Inventor
Philip Mueller
Attorneys Patented June 10, 1930

1,762,305

UNITED STATES PATENT OFFICE

PHILIP MUELLER, OF DECATUR, ILLINOIS, ASSIGNOR, BY MESNE ASSIGNMENTS, TO MUELLER CO., OF DECATUR, ILLINOIS, A CORPORATION OF ILLINOIS

SERVICE CLAMP

Application filed November 20, 1926. Serial No. 149,738.

The present invention relates to improvements in service clamps such as are employed in effecting the attachment of branch pipes to mains or conduits for gas, water, or other fluid.

Particularly, the object of the invention is to provide an improved means of connecting to the body of the saddle member of such a clamp the soft metal gasket commonly employed for providing a fluid-tight joint between such clamp and the main.

By the present invention a very simple and efficient means for connecting the gasket and clamp is provided which will retain the gasket in position while the clamp is being manipulated or applied to a main, the means connecting the gasket and saddle being prevented from having a tendency to loosen the joint between the clamp and pipe which has constituted a defect in some of the similar devices heretofore employed.

In the accompanying drawing:—

Figure 1 is a plan of a service clamp constructed in accordance with the present invention, showing the same applied to a fluid conduit or main.

Figure 2 is a sectional view substantially on the line 2—2 of Figure 1.

Figure 3 is a sectional view, on an enlarged scale, substantially on the line 3—3 of Figure 1, and showing the relation of some of the parts prior to the saddle member of the clamp being drawn into close engagement with the pipe or main.

Figure 4 is a view similar to Figure 3 showing the relation of the parts after the saddle member has been drawn into close engagement with the main.

Figure 5 is an inner face view of the hub portion of the saddle.

Figure 6 is a detail section substantially on the line 6—6 of Figure 4.

Referring to the drawing, in which like reference characters designate corresponding parts in the several views, the service clamp comprises a saddle member 1, which is curved to conform to the exterior surface of the main or conduit 2, to which it is to be applied and said saddle is adapted, as usual, to be secured in position upon the main 2 by suitable securing straps or yokes 3.

In some instances only a single strap or yoke 3 is provided, but the embodiment of the invention illustrated contemplates the use of two such securing members, the ends of which are extended through eyes 4 formed at the ends of the saddle member 1, and on which are screwed nuts 5, by tightening which the saddle is drawn into close engagement with the exterior surface of the main and retained in such position.

As usual, the saddle is provided with a tubular hub 6, the passage in which is threaded as at 7 for attachment of the branch pipe or for engagement with the tapping means employed for cutting an opening in the main 2.

The saddle is commonly made of cast iron, and in order to provide a fluid-tight joint about the bore in the hub 6 and the main 2, to which the clamp is applied, it is customary to provide a yielding packing or gasket about the inner end of the passage through the hub 6. Commonly this gasket is of soft metal such as lead, and in the embodiment of the invention illustrated this lead gasket 8 is received in a relatively shallow groove formed in the inner face of the hub, concentric with the bore therethrough.

The body of the gasket 8 may be initially of substantially circular form in cross section, and at diametrically opposite points is provided with lugs 9, which project laterally therefrom and are adapted to have their outer ends bend upward and inward over ears 10 formed at the base of the hub 6.

According to the present invention the lugs 9 by which the gasket is connected to the saddle so that they may be handled as a unitary piece, and there will be no danger of relative movement between them when applying the saddle to the main, extend through recesses formed in the inner faces of the ears 10 and extending therethrough, being in effect radial extensions of the groove before referred to.

The form of gasket employed is similar to that of patent to Schuermann No. 852,682, and the recesses in the inner faces of the ears 10 of the hub 6 are of such depth that when the saddle is drawn into close engagement with the main 2, said lugs will not be subjected to pressure between said ears and the main 2.

Experience has shown that when such securing lugs 9 of the soft metal gasket 10 are subjected to compression between the body of the hub and the main, there is a possibility of their effecting an undesirable loosening of the joint between the clamp and main. Lead, under pressure, continues to flow and such constant flow finally results in a loosening of the joint which is filled by the compressible material. By the present construction, however, the faces of the ears 10 at opposite sides of the recesses or radial extensions of the annular gasket receiving groove, through which the lugs 9 extend, can contact directly with the main 2 (as indicated at 12, Figures 4 and 6) without exerting direct pressure upon said lugs. The lugs, therefore, merely serve to retain the body of the gasket in proper position, while the clamp is being shifted and applied to the main.

The lugs 9 prevent any relative movement between the gasket and saddle so that no care on the part of the operative is necessary in applying the saddle to a main other than to see that the ends of the yoke members or securing straps are positioned within the eyes provided therefor at the ends of the saddle.

When the nuts 5 are tightened the body of the gasket 8 will be deformed to substantially the shape indicated in Figure 4. That is, portions of the body of the gasket will be forced radially inward, but, as shown clearly in this figure, the lower surface of the ears 10 will contact with the main 2 without exerting pressure on or compressing the lugs 9.

Experience with this particular construction has shown that it is a very decided and practical improvement in the art.

It will be understood, of course, that in the drawing the parts are shown more or less diagrammatically and the proportions shown may, of course, be varied, the drawing being intended to be illustrative rather than restrictive of the invention.

From the foregoing description and the drawing it will be seen that the invention provides a very simple and efficient means for connecting a soft metal gasket to the saddle of a service clamp so that relative displacement of these parts while being applied to a main is prevented and that the fastening lugs, by which the gasket and clamp are connected are not subjected to compressing force when the device is in use.

Having thus described the invention, what is claimed as new is:—

In a service clamp, the combination of a saddle comprising a tubular hub and arms projecting in opposite directions from the hub and adapted to be engaged with a securing strap, an annular groove, concentric with the bore of the hub and provided with recesses extending radially outward therefrom being formed in the inner surface of the saddle, and a soft metal gasket having its body seated in said groove and provided with lugs extending into said recesses, said lugs being of a thickness not exceeding the depth of the recesses, whereby when the clamp is secured to a main the saddle will contact with the main without effecting compression of said lugs.

In testimony whereof I have hereunto set my hand.

PHILIP MUELLER.